(12) United States Patent
Auvenshine et al.

(10) Patent No.: US 7,996,820 B2
(45) Date of Patent: Aug. 9, 2011

(54) DETERMINING PROPORTIONATE USE OF SYSTEM RESOURCES BY APPLICATIONS EXECUTING IN A SHARED HOSTING ENVIRONMENT

(75) Inventors: John J. Auvenshine, Tucson, AZ (US); Justin Blackburn, Surprise, AZ (US); Nicolas E. Fosdick, Frederick, CO (US); Christopher Jacoby, Chander, AZ (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 11/619,644

(22) Filed: Jan. 4, 2007

(65) Prior Publication Data

US 2008/0167977 A1     Jul. 10, 2008

(51) Int. Cl.
  *G06F 9/44* (2006.01)
  *G06F 21/00* (2006.01)
(52) U.S. Cl. ............ 717/127; 717/131; 705/52; 705/32; 705/34; 705/63
(58) Field of Classification Search .................. 717/127; 705/52
  See application file for complete search history.

(56) References Cited

U.S. PATENT DOCUMENTS

| | | | | |
|---|---|---|---|---|
| 5,155,680 | A * | 10/1992 | Wiedemer | 705/52 |
| 6,961,716 | B2 * | 11/2005 | Rhodes | 705/52 |
| 7,095,854 | B1 * | 8/2006 | Ginter et al. | 380/233 |
| 7,526,452 | B2 * | 4/2009 | Agarwal et al. | 705/52 |
| 2002/0062288 | A1 * | 5/2002 | Ooishi | 705/52 |
| 2002/0156741 | A1 * | 10/2002 | Furukawa | 705/52 |
| 2003/0083994 | A1 * | 5/2003 | Ramachandran et al. | 705/52 |
| 2004/0128515 | A1 * | 7/2004 | Rabin et al. | 713/176 |
| 2004/0133803 | A1 * | 7/2004 | Rabin et al. | 713/200 |
| 2005/0004879 | A1 | 1/2005 | Mathias et al. | |
| 2005/0010502 | A1 | 1/2005 | Birkestrand et al. | |
| 2005/0010667 | A1 | 1/2005 | Moriki et al. | |
| 2005/0044228 | A1 | 2/2005 | Birkestrand et al. | |
| 2005/0257020 | A1 | 11/2005 | Kashyap et al. | |
| 2006/0010031 | A1 | 1/2006 | Higuchi et al. | |

OTHER PUBLICATIONS aa.http://www-128.ibm.com/developerworks/eserver/library/es-aactutilities1/index.html "Advanced Accounting Utilities for AIX, Part 1: Process Accounting and LPAR Accounting" C. Eric Wu, Research Staff Member, IBM, Feb. 10, 2005.

* cited by examiner

*Primary Examiner* — Thomas K Pham
(74) *Attorney, Agent, or Firm* — Stephen J. Walder, Jr.; Jeffrey S. LaBaw

(57) ABSTRACT

Determining proportionate use of system resources by applications executing in a shared hosting environment, including executing monitor agents, one monitor agent for one or more instances of the applications, including collecting by the monitor agents data describing each instance of use of a system resource by an instance of the applications; storing by the monitor agents the collected data in data records, each data record representing a use of the system resources by a using instance of an application, the using instance comprising an instance of an application that uses a resource as represented by a data record; and storing by the monitor agents in the data records monitor tags, the monitor tags identifying each data record and identifying each using instance of an application for each data record.

15 Claims, 4 Drawing Sheets

DETERMINING PROPORTIONATE USE OF SYSTEM RESOURCES BY APPLICATIONS EXECUTING IN A SHARED HOSTING ENVIRONMENT

BACKGROUND OF THE INVENTION

1. Field of the Invention

The field of the invention is data processing, or, more specifically, methods, systems, and products for determining proportionate use of system resources by applications executing in a shared hosting environment.

2. Description of Related Art

Information technology (IT) providers are increasingly using shared servers having a shared infrastructure to create shared hosting environments that are capable of economically supporting smaller applications. Some of these shared servers are self-contained physical servers. In recent years, however, use of dynamic logical partitioning technology has enabled the division of a single large server into multiple, fully independent virtual machines ('VMs') or logical partitions ('LPARs'). The resources such as processing power and memory made available to the VMs and LPARs are statically or dynamically adjustable to meet the demand generated by the applications. However, billing or chargeback for the applications executed in the shared hosting environment is often based on static formulas that often do not relate to the actual usage of resources by each application. Therefore, there is a need for improvement in the determination of proportionate use and billing of system resources by applications executing in a shared hosting environment.

SUMMARY OF THE INVENTION

Methods, systems, and computer program products are provided for determining proportionate use of system resources by applications executing in a shared hosting environment, including executing monitor agents, one monitor agent for one or more instances of the applications, including collecting by the monitor agents data describing each instance of use of a system resource by an instance of the applications; storing by the monitor agents the collected data in data records, each data record representing a use of the system resources by a using instance of an application, the using instance comprising an instance of an application that uses a resource as represented by a data record; and storing by the monitor agents in the data records monitor tags, the monitor tags identifying each data record and identifying each using instance of an application for each data record.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
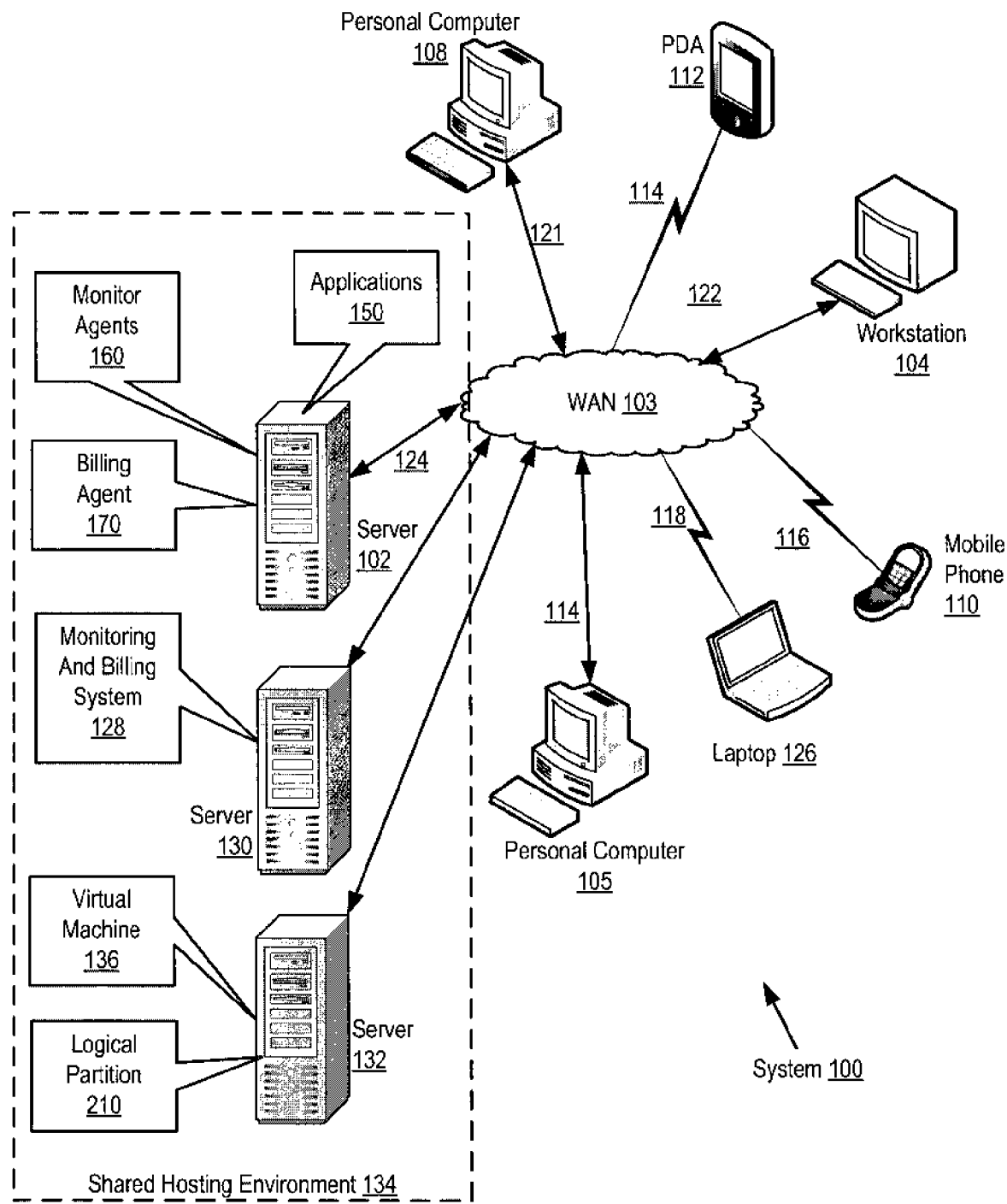
FIG. 1 sets forth a network diagram of a system for determining proportionate use of system resources by applications executing in a shared hosting environment according to embodiments of the present invention.

Exemplary methods, systems, and products for determining proportionate use of system resources by applications executing in a shared hosting environment in accordance with the present invention are described with reference to the accompanying drawings, beginning with FIG. 1. FIG. 1 sets forth a network diagram of a system (100) for determining proportionate use of system resources by applications executing in a shared hosting environment, according to embodiments of the present invention. Several exemplary hosts are connected to a WAN (103) including a PDA (112), a computer workstation (104), a mobile phone (110), server (102), a personal computer (105), and a laptop computer (126). The network-enabled mobile phone (110) connects to the WAN (103) through a wireless link (116), the PDA (112) connects to the WAN (103) through a wireless link (114), and the laptop (126) connects to the WAN (103) through a wireless link (118). In the example of FIG. 1, the personal computer (108) connects to the WAN (103) through a wired connection (121), the workstation (104) connects to the WAN (103) through a wired connection (122), and the server (102) also connects to the WAN (103) through a wired connection (124). In this example, servers (102, 130, 132) implement a shared hosting environment (134), and any of the other hosts are capable of utilizing applications running in the shared hosting environment. The network connection aspect of the architecture of FIG. 1 is only for explanation, not for limitation. In fact, systems for determining proportionate use of system resources by applications executing in a shared hosting environment according to embodiments of the present invention may be connected as LANs, WANs, intranets, the Internet, webs, the World Wide Web itself, or other connections as will occur to those of skill in the art. Such networks are media that may be used to provide data communications connections between various devices and computers connected together within an overall data processing system.

The exemplary system (100) of FIG. 1 is capable of determining proportionate use of system resources by applications executing in a shared hosting environment (134). As described herein, an application is a software program that is executable to perform at least one particular function. A web application is an application that is hosted by a web server and is accessible with a web browser over the WAN (103) network such as the Internet or an intranet. Any of the servers (124, 130, 132), or VMs or LPARs running on the servers, may implement a web server that supports web applications. Applications may vary in terms of size, functionality, and scope. Typical examples of applications include an enterprise resource planning ('ERP') software, database management software, e-commerce web application software, a graphical user interface ('GUI') program, a script for acquiring data, and similar others as will occur to those of skill in the art. A complex business application such as ERP may involve multiple computers and multiple software systems operating at multiple locations. For example, an application that handles transaction processing for a web ordering system may include many connected servers running different software and operating at different geographic locations. A smaller, less complex application may reside in a single server. Small applications are typically software instances that are used to facilitate the processing of larger more complex business applications. For example, multiple IBM WebSphere™ applications may be used to process transactions for a larger web ordering application.

Server (132) represents computer resources available to support instances of applications executing in the shared hosting environment (132). Server (132) supports a virtual machine (136) and a logical partition (210), each of which may be used to execute instances of applications, monitor agents, billing agents, and billing systems according to embodiments of the present invention. A virtual machine is a computer or server configured with a multi-user shared-resource operating system that gives each using instance of an application the appearance of having sole control of all the resources of the system. A logical partition ('LPAR') is the division of a computer's processors, memory, and storage into multiple sets of resources so that each set of resources can be operated independently with its own instance of an operating system instance and its own using instances of applications. The number of logical partitions that can be created depends on the system's processor model and resources available. Logical partitions typically are used for different purposes such as database operation or client/server operation or to separate test and production environments, for example. Each logical partition can communicate with other logical partitions as if the other logical partitions are in separate machines.

As described in this specification, a shared hosting environment (134) is a set of computing system resource that is shared among multiple applications. The shared hosting environment includes one or more physical processors, each of which may be compartmentalized into independent virtual machines ('VMs') or virtual servers and/or logical partitions ('LPARs'), each of the VMs and LPARs being capable of supporting an operating system and one or more applications and instances of applications. The portions of computing system resources such as processing power, memory, disk space, and I/O bandwidth made available to the VMs and LPARs are dynamically adjusted to meet the demand generated by the applications. Similarly according to embodiments of the present invention, the portions of computing system resources such as processing power, memory, disk space, and I/O bandwidth made available to an application may be determined on a shared hosting environment on a computer whose resources are not apportioned among virtual machines, virtual servers, or logical partitions.

The exemplary system (100) of FIG. 1 includes a number of computers (e.g., 108, 112, 104, 126, 102, and 110) connected for data communications by the WAN (103). Any one of the exemplary computers illustrated here may support or utilize applications running in a shared hosting environment (134) that is capable of hosting applications (150) and instances of applications. The system (100) includes a monitoring and billing system (128) for the applications (150) executing on server (130), although it is understood that any other computer is also capable of supporting the monitoring and billing system (128). The monitoring and billing system (128) includes monitor agents (160) that are capable of collecting data describing each instance of use of a system resource by an instance of the applications (150). A using instance of an application is an instance of an application that uses a system resource as represented by a data record of the collected data, the data record being identifiable by a monitor tag. Thus, for each instance of an application (150) there is a corresponding monitor agent, and, for each using instance of an application, a corresponding monitor agent collects and stores in a data record data describing each instance of use of a system resource. The data record may include data describing instances of use of processing power, memory, I/O bandwidth, disk space, databases, Internet infrastructure components, e-mail systems, network, print environment components within the shared hosting environment and similar others, as will occur to those of skill in the art.

In the exemplary monitoring and billing system (128) of FIG. 1, the monitor agents (160) are configured to determine the number of monitor agents, to define computer resources that are desired to be monitored for usage, and to define attributes for collection of the data from the named sources. Thus, once configured, the monitor agents (160) are executable to automatically collect and store the data describing each instance of use of a system resource by an instance of an application (150). The exemplary monitoring and billing system (128) of FIG. 1 also includes a billing agent (170) that is capable of extracting usage data from the collected data for a selected one of a plurality of using instances of applications, and billing for usage of the selected one of the plurality of using instances of the applications in dependence upon the collected usage data for the selected one of the plurality of instances of the application. The exemplary monitor agents (160) and the billing agent (170) are presented for explanation and not for limitation. In fact, new business rules and decision making logic that define the billing may be added to the billing agent (170) in many ways. Similarly, new system resources may be added for monitoring and data collection by the monitor agents (160). Therefore, the monitor agent functions and the billing agent functions according to the present invention include many different functions as will occur to those of skill in the art.

In the example shared hosting environment (134) of FIG. 1, of applications (150), monitor agents (160), and a billing agent (170) are shown running on one server (102), with a monitoring and billing system (128) on another server (130), and a virtual machine (136) and a logical partition (132) on still a third server (132). This overall arrangement is only for explanation, however, not a limitation of the invention. Shared hosting environments that determines proportionate use of system resources by applications according to embodiments of the present invention may include any number of servers, virtual machines, logical partitions, using instances of applications, monitor agents, and so on. The virtual machines and logical partitions may be installed on all the servers, some of the servers, or none of the servers. The use of virtual machines and multiple servers is optional. A shared hosting environment that determines proportionate use of system resources by applications according to embodiments of the present invention may be implemented on a single machine, with no virtual machines or logical partitions, with monitor agents and using instances of applications running in separate threads of execution, for example.

The arrangement of devices making up the exemplary system (100) illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), Bluetooth, proprietary protocols, and others as will occur to those of skill in the art. Various embodiments of the present invention may be implemented on a variety of hardware platforms in addition to those illustrated in FIG. 1.

Determining proportionate use of system resources by applications executing in a shared hosting environment in accordance with the present invention is generally implemented with computers, that is, with automated computing machinery. In the system (100) of FIG. 1, for example, the server, all the client devices, and the network are implemented to some extent at least as computers. For further explanation, therefore, FIG. 2 sets forth a block diagram of automated computing machinery comprising an exemplary monitoring and billing system (128) useful in determining proportionate use of system resources by applications executing in a shared hosting environment according to embodiments of the present invention. The monitoring and billing system (128) of FIG. 2 includes shared hardware resources that are dynamically allocable between multiple LPARs in response to a demand. The shared resources, amongst others, include at least one computer processor (256) or 'CPU', a random access memory (268) ('RAM') which is connected through a system bus (260) to the at least one processor (256), and a communications adapter (267). The monitoring and billing system (128) includes two LPARs: LPAR1 (210), and LPAR2 (220). It is understood that depending on the application less or more number of LPARs may be included, as will occur to those of skill in the art. The LPAR1 (210) includes the applications (150), the monitor agents (160), and the billing agent (170). Also included in the LPAR1 (210) is an operating system (254). Operating systems useful in computers according to embodiments of the present invention include UNIX™, Linux™, Microsoft XP™, AIX™, IBM's i5/OS™, and others as will occur to those of skill in the art. The LPAR2 (220) may include similar programs.

Thus, stored in RAM (268) are the monitor agents (160), modules of computer software that determine proportionate use of system resources by applications executing in a shared hosting environment according to the present invention, one monitor agent for one or more instances of the applications (150). Each monitor agent (160) is capable of functioning generally to determine proportionate use of system resources by applications executing in a shared hosting environment by executing one monitor agent (160) for one or more executing instances of an application (150), including collecting by the monitor agents data describing each instance of use of a system resource by an instance of the applications; storing the collected data in data records (350); and storing monitor tags (351) in the data records (350). The shared hosting environment is represented here by LPAR1 (210) and LPAR2 (220). Each data record (350) represents a use of a system resource by a using instance of an application (150). A 'using instance of an application' is an instance of an application that uses a resource as represented by a data record (350). The monitor tags (351) identify each data record and identify a using instance of an application for each data record.

Figure 2:
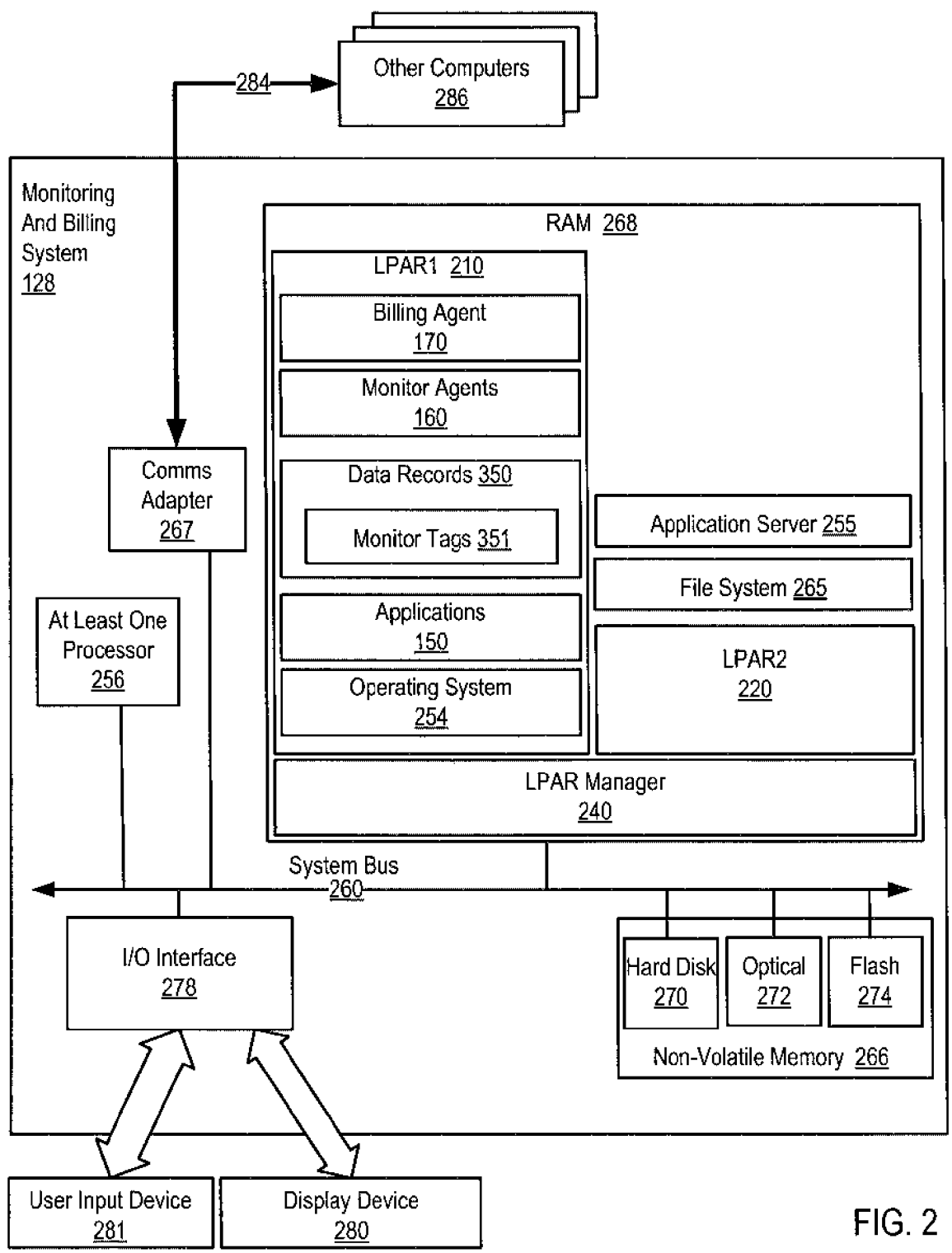
FIG. 2 sets forth a block diagram of automated computing machinery comprising an exemplary monitoring and billing system useful in determining proportionate use of system resources by applications executing in a shared hosting environment according to embodiments of the present invention.

The example of FIG. 2 also includes a billing agent (170) stored in RAM (268). The billing agent (170) is a module of computer program instructions for extracting usage data from collected data for a selected one of a plurality of using instances of applications by selecting a plurality of data records having at least a portion of a monitor tag matching an identifier of the selected one of the plurality of using instances of applications and billing for usage of the selected one of the plurality of using instances of the applications in dependence upon the collected usage data for the selected one of the plurality of instances of the application.

The monitoring and billing system (128) of FIG. 2 includes an LPAR manager (240), a functional computer module that dynamically allocates and de-allocates physical resources to LPAR1 (210) and LPAR2 (220) in response to the demand generated by the applications (150). The LPAR manager (240) may be implemented as hardware, firmware, and software, or a combination thereof.

The shared resources of the monitoring and billing system (128) include an application server (255) that is stored in RAM (268). The application server (255) is a software platform that provides shared services and infrastructure required to develop and deploy business logic necessary to provide web clients with access to enterprise information systems. Another shared resource is a file system (265), a software system that provides shared data filing services and infrastructure required to deploy logic necessary to read, write, and store data, e.g., data received from web sites. The data may be stored locally in RAM (268), on computers connected to a WAN (103 on FIG. 1), in an enterprise wide repository, or somewhere in cyberspace specified by a Uniform Resource Locator ('URL'). Although the billing agent, the monitor agents, the applications, the operating system, and the LPARs are shown disposed in RAM in this example, it is understood that all or part of such components may be stored in non-volatile memory (166) also.

The monitoring and billing system (128) of FIG. 2 includes non-volatile computer memory (266) coupled through a system bus (260) to the at least one processor (256) and to other components. Non-volatile computer memory (266) may be implemented as a hard disk drive (270), optical disk drive (272), electrically erasable programmable read-only memory space (so-called 'EEPROM' or 'Flash' memory) (274), RAM drives (not shown), or as any other kind of computer memory as will occur to those of skill in the art.

The exemplary monitoring and billing system (128) of FIG. 2 includes one or more input/output interface adapters (278). Input/output interface adapters implement user-oriented input/output through, for example, software drivers and computer hardware for controlling output to display devices (280) such as computer display screens, as well as user input from user input devices (281) such as keyboards and mice.

The exemplary monitoring and billing system (128) of FIG. 2 includes a communications adapter (267) for implementing data communications (284) with other computers (286). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining proportionate use of system resources by applications executing in a shared hosting environment according to embodiments of the present invention include modems for wired dial-up communications, Ethernet (IEEE 802.3) adapters for wired network communications, and IEEE 802.11 a/b/g adapters for wireless network communications. It is understood, that additional number of hardware and software resources such as processors, memory, operating systems, I/O adapters, and similar others may be included in the monitoring and billing system (128), as will occur to those of skill in the art.

Figure 3:
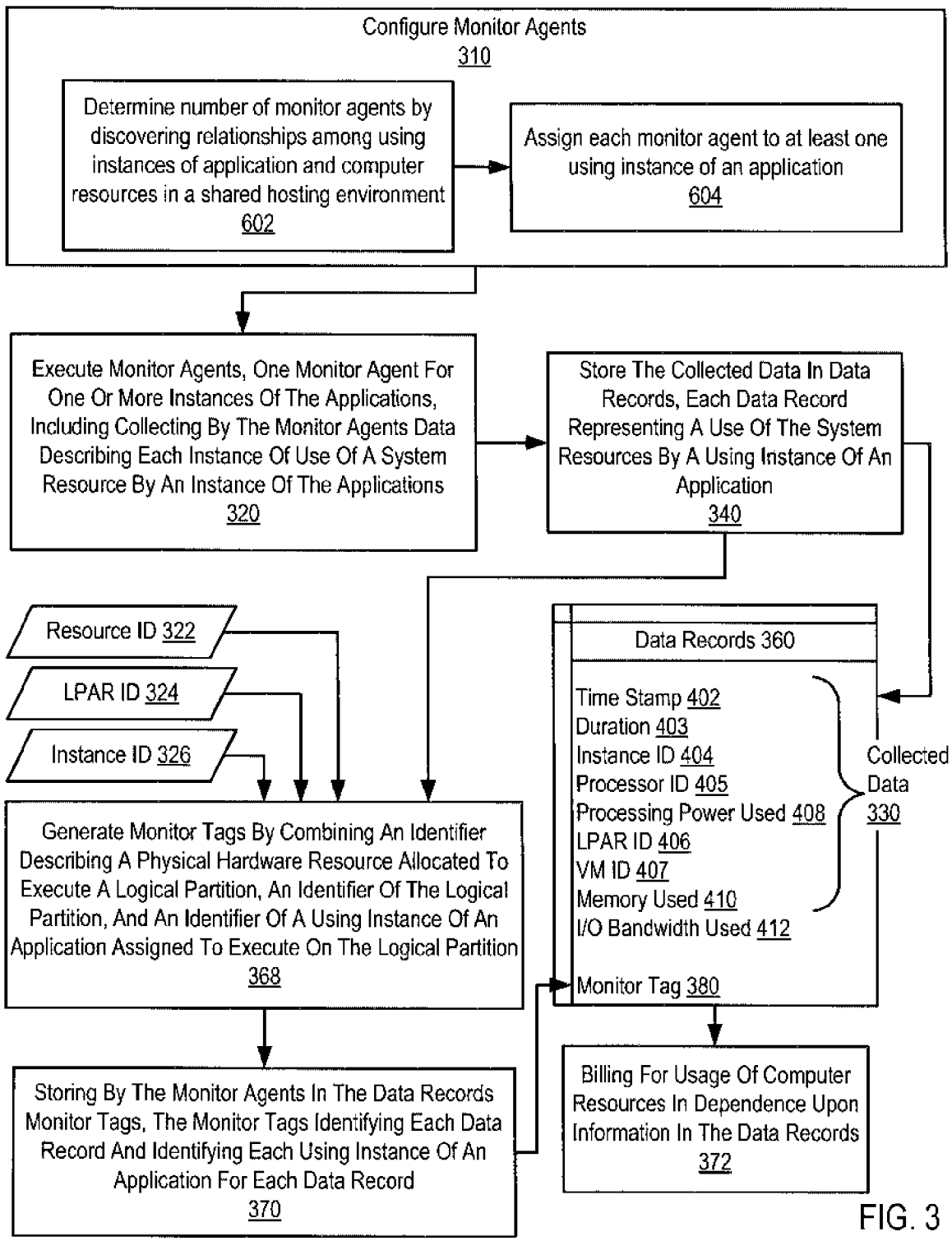
FIG. 3 sets forth a flow chart illustrating a method of determining proportionate use of system resources by applications executing in a shared hosting environment according to embodiments of the present invention.

For further explanation, FIG. 3 sets forth a flow chart illustrating a method of determining proportionate use of system resources by applications executing in a shared hosting environment according to embodiments of the present invention. The method of FIG. 3 includes configuring (310) monitor agents (160). A monitor agent is an instance of a software module that monitors and records the use of computer resources by an instance of an application, one monitor agent for one or more instances of an application to be monitored. In this example, configuring (310) monitor agents includes determining (602) the number of monitor agents to configure. Determining (602) the number of monitor agents to configure is carried out by discovering relationships among using instances of applications and computer resources in a shared hosting environment. As described above, the shared hosting environment includes physical hardware resources allocated to execute logical partitions ('LPARs') and LPARs allocated to execute the using instances of applications. Visibility into the applications (150) for discovering relationships with resources is provided by automatically creating and maintaining application infrastructure maps. Examples of auto discovery programs or agents capable of automatically generating the application infrastructure maps include: Change and Configuration Management Database (CCMDB) available from IBM®, and Tivoli® Application Dependency Discovery Manager (TADDM) available from IBM®, and similar others as will occur to those of skill in the art. These agents generate the infrastructure maps by discovering applications and relationships between the applications, the LPARs, and the physical hardware resources for use with determining proportionate use of system resources by applications executing in a shared hosting environment according to the present invention. In this example, configuring (310) monitor agents also includes assigning each monitor agent to at least one using instance of an application executing on one of the LPARs.

The method of FIG. 3 also includes executing (320) monitor agents, one monitor agent for one or more instances of the applications, including collecting by the monitor agents data describing each instance of use of a system resource by an instance of the applications. That is, a monitor agent may be assigned to collect usage data for one instance of an application or for two or more instances of one or more applications. Executing (320) monitor agents may be carried out by executing each monitor agent in a separate process or thread of execution. Such a separate process or thread of execution may be executed in an LPAR. More than one monitor agent may execute in a single LPAR when, for example, more than one instance of an application to be monitored is executed in the LPAR. Executing (320) monitor agents includes the monitor agents' collecting data (330) describing each instance of use of a system resource by an instance of the applications (150), and the method of FIG. 3 includes storing (340) the collected data in data records (360). Each data record represents a use of the system resources by a using instance of an application. A 'using instance' is an instance of an application that uses a computer resource as represented by a data record (360).

In the method of FIG. 3, the collected data (330) includes time stamped usage values of a plurality of attributes of computer resource usage, the plurality of attributes describing physical hardware resources and logical partitions allocated to execute the usage instances of the applications. Each data record includes a time stamp (402) that identifies the data and time of a particular usage of computer resources by a using instance of an application. Each data record includes a data element (404) identifying the usage instance of the application whose usage is represented by a particular data record. A data element (406) is included in each data record to identify or describe the logical partition allocated to execute the usage instance of the application whose usage is represented by a particular data record. Data elements of the data records describing use of hardware resources in this example include processor identifications (405), processing power used (410), memory used (410), input/output bandwidth used (412). The example data elements also include a duration field (403) for recording a time duration that may used to record, for example: 10% usage of CPU number 10223 between 5:00 a.m. and 5:05 a.m. on Aug. 20, 2006.

The method of FIG. 3 also includes generating (368) the monitor tags (380) by combining an identifier (322) describing a physical hardware resource allocated to execute a logical partition, an identifier (324) of the LPAR, and an identifier (326) of a using instance of an application assigned to execute on the LPAR. The monitor tags, that is, the values of the monitor tags, are generated automatically by the monitor agents (160) by combining the identifiers (322, 324, 326). For example, a data record describing an instance of a use of system resources by a first instance of an ERP application executing on LPAR1 (210 on FIG. 2), the LPAR1 (210) being executed on physical hardware resource identified as "ERP_Server1" may be identified by a monitor tag expressed as:

"ERP_Server1_LPAR1_ERP_Application_Instance1_
Using_Instance1"

The monitor tag may also include additional identifiers such as a time stamp for an instance of usage, a time duration for a period of usage, or other information as may occur to those of skill in the art. Each monitor tag (380) thus provides a reference to identify a using instance of an application, such as 'Using_Instance1' of the 'Instance1' of the 'ERP_Application.' Even if the ERP application is dynamically assigned or re-assigned for execution on another LPAR, e.g., LPAR2 (220 on FIG. 2) or is automatically transferred to be executed on another physical hardware resource such as an ERP_Server2, the monitor tag may include a reference to the using instance of the same instance of the application ERP_Application. Thus, the monitor tag may identify the using instance of an application in a way that is independent of the actual physical and virtual resources that may be used to execute the application or any instance of the application at any particular point in time.

The method of FIG. 3 also includes the monitor agents' storing (370) in the data records (360) monitor tags (380), the monitor tags identifying each data record and identifying each using instance of an application for each data record. That is, each monitor tag value, generated as described above, uniquely identifies the data record in which the monitor tag is stored and also uniquely identifies the using instance of an application whose usage of a computer resource is represented by the data record in which the monitor tag value is stored.

Figure 4:
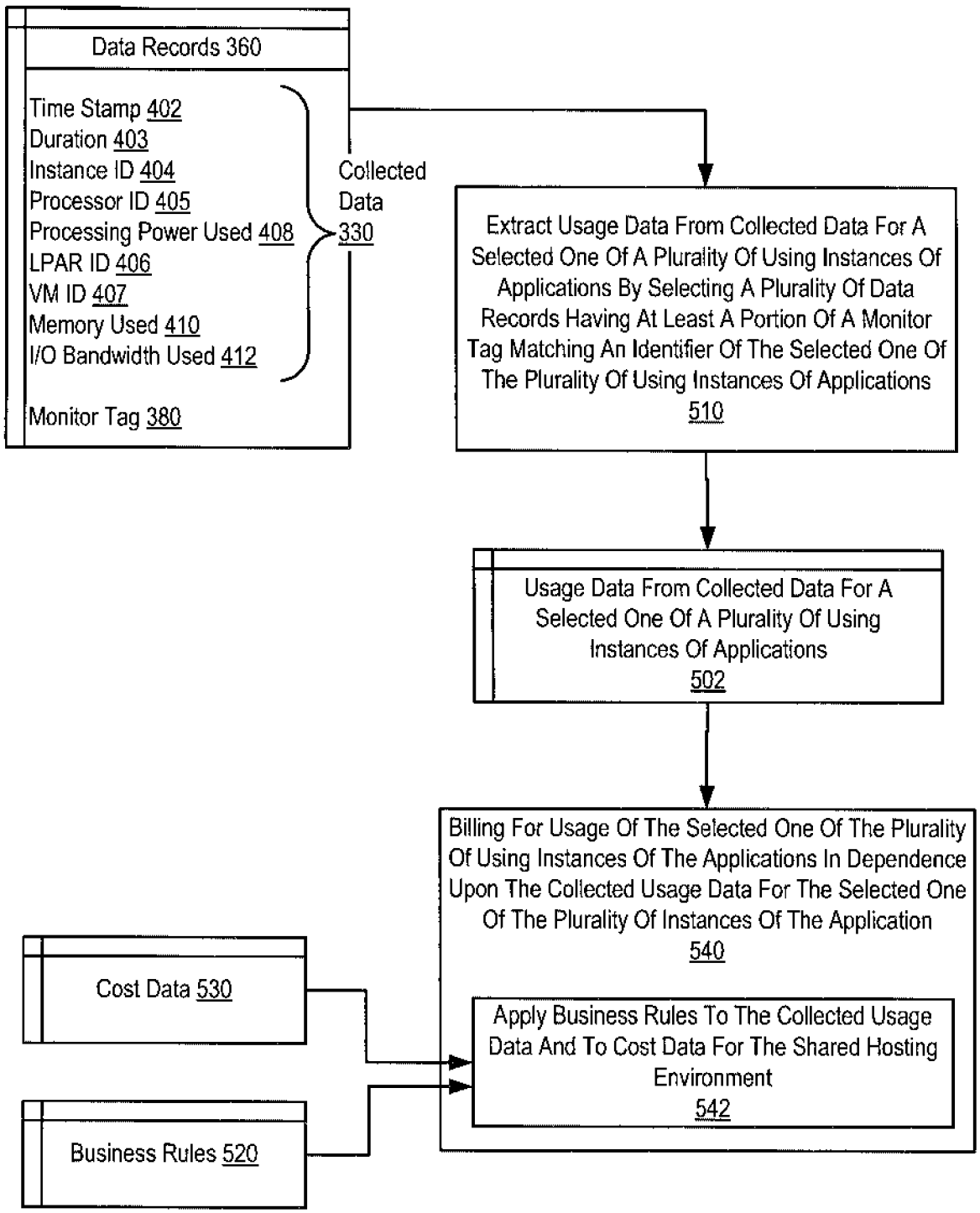
FIG. 4 sets forth a flow chart of an exemplary method of billing, in a system that determines proportionate use of system resources by applications executing in a shared hosting environment according to embodiments of the present invention, for usage of computer resources in dependence upon information in the data records.

The method of FIG. 3 includes billing (372) for usage of computer resources in dependence upon information in the data records (360). For further explanation, FIG. 4 sets forth a flow chart of an exemplary method of billing, in a system that determines proportionate use of system resources by applications executing in a shared hosting environment according to embodiments of the present invention, for usage of computer resources in dependence upon information in the data records (360). The method of FIG. 4 includes extracting (510) usage data (502) from collected data for a selected one of a plurality of using instances of applications by selecting a plurality of data records having at least a portion of a monitor tag matching an identifier of the selected one of the plurality of using instances of applications.

Consider, for example, a set of data records having these monitor tag values:
   appInstance1_LPAR1_ram
   appInstance1_LPAR1_proc
   appInstance1_LPAR1_io
   appInstance2_LPAR1_ram
   appInstance2_LPAR1_proc
   appInstance2_LPAR1_io
   appInstance3_LPAR2_ram
   appInstance3_LPAR2_proc
   appInstance3_LPAR2_io The monitor tag values describe nine instances of resource usage by three using instances of applications identified as appInstance1, appInstance2, and appInstance3. The three using instances of applications are assigned for execution to two LPARs, identified as LPAR1 and LPAR2. The monitor tag values identify instances of usage of three computer resources: random access memory ('ram'), processing power ('proc'), and input/output bandwidth ('io'). Selecting a plurality of data records having at least a portion of a monitor tag matching an identifier of the selected one of the plurality of using instances of applications, then, if carried out with appInstance1 representing the selected one of the using instances of applications, for example, would select the data records containing these three monitor tag values:
   appInstance1_LPAR1_ram
   appInstance1_LPAR1_proc
   appInstance1_LPAR1_io The method of FIG. 4 also includes billing (540) for usage of the selected one of the plurality of using instances of the applications in dependence upon the collected usage data for the selected one of the plurality of instances of the application. In this example, the billing (540) includes applying (542) business rules (520) to the collected usage data (330, 502) and to cost data (530) for a shared hosting environment. Business rules or business rulesets in this example are descriptions of operations, definitions, and constraints that apply to billing procedures in systems that bill for proportionate use of system resources by applications executing in a shared hosting environment according to embodiments of the present application. Such business rules can be expressed in various languages, including, for example, UML, Z notation, Business Rules Markup Language ('BRML'), Ws policy, Business Process Modeling Notation ('BPMN') Business Process Modeling Language ('BPML'). In this example, business rules describe formulas and procedures for combining collected usage data and cost data to formulate bills for usage of computing resources.

Exemplary embodiments of the present invention are described to a large extent in this specification in terms of methods for determining proportionate use of system resources by applications executing in a shared hosting environment. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the invention described monitoring and billing system for web applications, it would be within the spirit and scope of the invention to encompass an embodiment deploying a monitoring and billing system for any application, including stand-alone applications executing on a single computer.

Exemplary embodiments of the present invention are described largely in the context of a fully functional computer system for determining proportionate use of system resources by applications executing in a shared hosting environment. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of determining proportionate use of system resources by applications executing in a shared hosting environment, the method comprising:
   executing monitor agents, one monitor agent for one or more instances of the applications, including collecting by the monitor agents data describing each instance of use of a system resource by an instance of the applications;
   storing by the monitor agents the collected data in data records, each data record representing a use of the system resources by a using instance of an application, the using instance comprising an instance of an application that uses a resource as represented by a data record;
   storing by the monitor agents in the data records monitor tags, the monitor tags identifying each data record and identifying each using instance of an application for each data record; and billing for usage of computer resources in dependence upon information in the data records, including:
  extracting usage data from collected data for a selected one of a plurality of using instances of applications by selecting a plurality of data records having at least a portion of a monitor tag matching an identifier of the selected one of the plurality of using instances of applications; and
  billing for usage of the selected one of the plurality of using instances of the applications in dependence upon the collected usage data for the selected one of the plurality of instances of the application.

2. The method of claim 1 wherein billing further comprises applying business rules to the collected usage data and to cost data for the shared hosting environment.

3. The method of claim 1 further comprises configuring the monitor agents, including:
  determining the number of monitor agents to configure, including discovering relationships among using instances of application and computer resources in the shared hosting environment, the shared hosting environment including physical hardware resources allocated to execute the using instances of applications; and
  assigning each monitor agent to at least one using instance of an application executing on one of the logical partitions.

4. The method of claim 1 further comprising generating the monitor tags by combining an identifier describing a physical hardware resource allocated to execute a logical partition, an identifier of the logical partition, and an identifier of a using instance of an application assigned to execute on the logical partition.

5. The method of claim 1 wherein the collected data includes time stamped usage values of a plurality of attributes of computer resource usage, the plurality of attributes describing physical hardware resources, optionally including virtual machines, and logical partitions allocated to execute the usage instances of the applications.

6. A system for determining proportionate use of system resources by applications executing in a shared hosting environment, the system comprising a computer processor, a computer memory operatively coupled to the computer processor, the computer memory having disposed within it computer program instructions capable of:
  executing monitor agents, one monitor agent for one or more instances of the applications, including collecting by the monitor agents data describing each instance of use of a system resource by an instance of the applications;
  storing by the monitor agents the collected data in data records, each data record representing a use of the system resources by a using instance of an application, the using instance comprising an instance of an application that uses a resource as represented by a data record;
  storing by the monitor agents in the data records monitor tags, the monitor tags identifying each data record and identifying each using instance of an application for each data record; and
  extracting usage data from collected data for a selected one of a plurality of using instances of applications by selecting a plurality of data records having at least a portion of a monitor tag matching an identifier of the selected one of the plurality of using instances of applications; and
  billing for usage of the selected one of the plurality of using instances of the applications in dependence upon the collected usage data for the selected one of the plurality of instances of the application.

7. The system of claim 6 wherein the billing further includes computer program instructions capable of applying business rules to the collected usage data and to cost data for the shared hosting environment.

8. The system of claim 6 wherein the computer memory also has disposed with in it computer program instructions capable of configuring the monitor agents including:
  determining the number of monitor agents to configure, including discovering relationships among using instances of application and computer resources in the shared hosting environment, the shared hosting environment including physical hardware resources allocated to execute the using instances of applications; and
  assigning each monitor agent to at least one using instance of an application executing on one of the LPARs.

9. The system of claim 6 wherein the computer memory also has disposed with in it computer program instructions capable of generating the monitor tags by combining an identifier describing a physical hardware resource allocated to execute a logical partition, an identifier of the logical partition, and an identifier of a using instance of an application assigned to execute on the logical partition.

10. The system of claim 6 wherein the collected data includes time stamped usage values of a plurality of attributes of computer resource usage, the plurality of attributes describing physical hardware resources, optionally including virtual machines, and logical partitions allocated to execute the usage instances of the applications.

11. A computer program product for determining proportionate use of system resources by applications executing in a shared hosting environment, the computer program product embodied on a recordable computer-readable medium, the computer program product comprising:
  computer program instructions for executing monitor agents, one monitor agent for one or more instances of the applications, including collecting by the monitor agents data describing each instance of use of a system resource by an instance of the applications;
  computer program instructions for storing by the monitor agents the collected data in data records, each data record representing a use of the system resources by a using instance of an application, the using instance comprising an instance of an application that uses a resource as represented by a data record; and
  computer program instructions for storing by the monitor agents in the data records monitor tags, the monitor tags identifying each data record and identifying each using instance of an application for each data record; and
  computer program instructions for extracting usage data from collected data for a selected one of a plurality of using instances of applications by selecting a plurality of data records having at least a portion of a monitor tag matching an identifier of the selected one of the plurality of using instances of applications; and
  computer program instructions for billing for usage of the selected one of the plurality of using instances of the applications in dependence upon the collected usage data for the selected one of the plurality of instances of the application.

12. The computer program product of claim 11 wherein computer program instructions for the billing further includes computer program instructions capable of applying business rules to the collected usage data and to cost data for the shared hosting environment.

13. The computer program product of claim 11 further comprises computer program instructions for configuring the monitor agents, including:

computer program instructions for determining the number of monitor agents to configure, including discovering relationships among using instances of application and computer resources in the shared hosting environment, the shared hosting environment including physical hardware resources allocated to execute the using instances of applications; and computer program instructions for assigning each monitor agent to at least one using instance of an application executing on one of the LPARs.

14. The computer program product of claim 11 further comprising computer program instructions for generating the monitor tags by combining an identifier describing a physical hardware resource allocated to execute a logical partition, an identifier of the logical partition, and an identifier of a using instance of an application assigned to execute on the logical partition.

15. The computer program product of claim 11 wherein computer program instructions for the collected data includes time stamped usage values of a plurality of attributes of computer resource usage, the plurality of attributes describing physical hardware resources, optionally including virtual machines, and logical partitions allocated to execute the usage instances of the applications.

* * * * *